United States Patent [19]

Schroeder

[11] 4,274,291

[45] Jun. 23, 1981

[54] GYRO WHEEL SPEED COMPENSATION

[75] Inventor: George F. Schroeder, Wayne, N.J.

[73] Assignee: The Singer Company, Little Falls, N.J.

[21] Appl. No.: 955,864

[22] Filed: Oct. 30, 1978

[51] Int. Cl.³ ............................................. G01C 19/08
[52] U.S. Cl. ...................................... 74/5.37; 74/5.4; 74/5.7
[58] Field of Search ....................... 74/5.37, 5.34, 5.7, 74/5.4, 5 R; 318/318, 701, 702, 310, 311

[56] References Cited

U.S. PATENT DOCUMENTS

| 3,176,524 | 4/1965 | Schlitt et al. | 74/5.37 |
| 3,283,593 | 11/1966 | Fischel | 74/5.37 |
| 3,438,268 | 4/1969 | Goodwin et al. | 74/5 R |
| 3,659,169 | 4/1972 | Waddicor | 318/701 X |

FOREIGN PATENT DOCUMENTS 807065 1/1959 United Kingdom ...................... 74/5.7

Primary Examiner—Rodney H. Bonck
Attorney, Agent, or Firm—Laurence A. Wright; Thomas W. Kennedy

[57] ABSTRACT

A device for compensating for gyro wheel frequency inaccuracies wherein a reference oscillator feeds a square wave signal to a first and second counter. The second counter also has an input of plus or minus the spin axis angular rate. The first counter scales down the reference signal and the second counter generates a signal having a frequency proportionately higher than the first counter. The output of the second counter provides a signal indicative of angular spin rate displaced from the input gyro axis. The outputs from the first and second counters are fed to an up/down counter which combines the two signals to provide for gyro wheel compensation.

In a second embodiment of the invention a computer having spin rate axis signal from two gyros, control two settable counters to obtain compensation of the gyro wheel of a first and second gyro.

6 Claims, 4 Drawing Figures

GYRO WHEEL SPEED COMPENSATION

This invention is related to strapdown inertial systems. More particularly, this invention is related to a device to adjust the frequency of the gyro wheel supply in order to keep the speed of the gyro inertially constant.

BACKGROUND OF THE INVENTION

In a strapdown inertial system the gyros are fixed to the aircraft and subjected directly to the motion of the aircraft. Normally the average effects of the input angular rates about the input gyro axis are compensated for in the system computer. Angular rates about the gyro spin axis will increase or decrease the absolute spin velocity of the gyro and thereby change the scale factor of the gyro torquer. This is caused by the fact that the gyro is driven by a synchronous motor excited by a constant frequency. This effectively locks the speed of the gyro to the airframe. Aircraft angular rates about the spin axis require that the gyro wheel be accelerated or decelerated to keep up with the aircraft movement. The computer compensation circuits attempt to correct the torquer scale factor changes caused by the average changes in the absolute gyro wheel speed.

The compensation made in the computer is not dynamically correct whenever there is angular vibration or angular acceleration displaced from the gyro spin axis. The problem is that the synchronous motor is essentially a torsion spring whose torque is approximately equal to $K\theta$ where $\theta$ is the phase angle between the stator motor flux and the magnetic pole of the rotor. This tortional spring in combination with the inertia of the gyro wheel forms a torsion pendulum whose period is usually a few cycles per second. The gyro speed will then "hunt" about the synchronous speed when subjected to angular perturbations. In a strapdown inertial system this gyro wheel hunting may give rise to unpredictable scale factor errors which are not compensated for in the computer.

Normally strapdown systems compensate for the change in scale factor of the torquer by assuming that the gyro speed with respect to the mounting body is a constant. The computer, by using the measured angular rates, then computes the change in torquer scale factor of the torquer based on this premise. Since the torquer capability of the gyro spin motor is low its ability to accelerate and decelerate the rotor is poor. Therefore, under angular accelerations and angular vibration the actual action of the wheel momentum is unknown and we therefore introduce errors.

The present invention overcomes these scale factor errors by devising a device that will adjust the frequency of the gyro wheel supply in such a manner as to maintain the speed of the gyro inertially constant. If the frequency of the gyro wheel supply is properly modulated by a signal proportional to the angular rate about the gyro spin axis, there will be no acceleration of the gyro synchronous motor output. Therefore, the torsion pendulum will not be disturbed and the gyro will run at a constant inertial speed and no torquer compensation will be required due to spin axis rate.

BRIEF DESCRIPTION OF THE INVENTION

In a first embodiment of the invention a reference oscillator feeds a scale down counter and a spin axis counter. The scale down counter scales down the reference oscillator to drive an up/down counter. The spin rate counter is set by the input angular rate to produce a number of pulses proportional to the spin axis angular rate input during each ½ cycle of the up/down counter. The up/down counter is suitably controlled to count the sum of the outputs of the scale down counter and the spin axis rate counter. The output from the up/down counter then is a signal for correcting the gyro wheel supply frequency.

In a second embodiment of the invention the reference oscillator provides inputs to a first and second adjustable counter. A computer input is also supplied to these counters. In this embodiment the computer receives input axis rates from a first and second gyro and the output of this arrangement from the two counters are signals correcting the gyro wheel frequency of each gyro.

Accordingly, it is an object of this invention to provide a device for a strapdown inertial system that will adjust the frequency of the gyro wheel supply in order to keep the speed of the gyro inertially constant.

This and other objects, features and advantages of the present invention will become apparent from the following description taken in conjunction with the accompanying drawings wherein.

Figure 1:
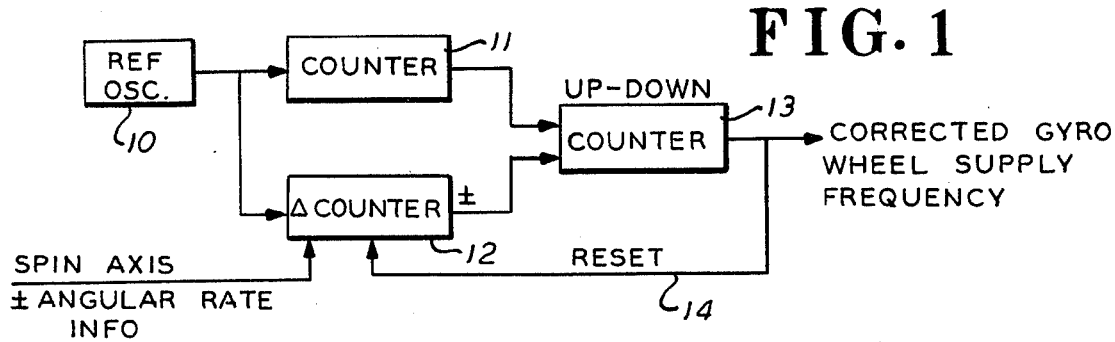
FIG. 1 is a first embodiment of the invention showing a reference oscillator feeding inputs to a scale down counter and a spin axis rate counter and where an up/down counter employs the outputs of the aforementioned counters to provide a signal correcting the gyro wheel frequency.
Figure 2:
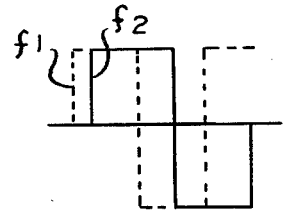
FIG. 2 shows the square wave output of the up/down counter of FIGS. 1 and 4 with dotted lines indicating frequency correction.

Referring now to FIGS. 1 and 2 which show a first embodiment of the present invention. The output timing signals from reference oscillator 10 is counted down by scale down counter 11 to produce the basic gyro wheel frequency square wave to drive the gyro synchronous motor (not shown). Spin axis rate information is received from the other gyro in the system and is used to set spin rate counter 12 to produce a number of pulses proportional to spin axis rate. Up/down counter 13, which is connected to the outputs of counters 11 and 12 with suitable control logic, counts the outputs of scale down counter 11 and counts up or down the output of spin axis counter 12 to produce a square wave (FIG. 2) whose frequency will be the desired corrected value. The square wave output (FIG. 2) on feedback line 14 is also used to reset spin axis counter 12 each ½ cycle. Since the number of pulses out of scale down counter 11, for each ½ cycle of up/down counter 13 are much greater than the output of spin rate axis counter 12, the output of up/down counter 13 will be a square wave whose transition will be properly modulated in time (see dotted line of FIG. 2) by the spin axis rate information.

The waveform of FIG. 2 shows that not only does the leading edge move but so does the pulse width. For example, when there is a higher frequency the period is obviously shorter.

In the embodiment of FIG. 1 each gyro of the system (for example, the X and Y gyros) will require its own spin rate axis counter, up/down counter and gyro wheel power switching module. Each spin rate axis counter would be supplied by a digital rate signal derived from the appropriate axis of another gyro.

Figure 3:
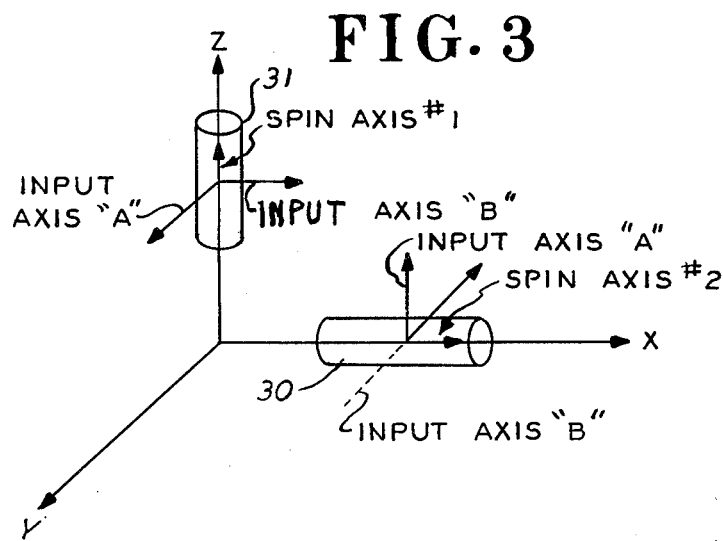
FIG. 3 shows the orientation along the three orthogonal axes of the two gyros of FIG. 4.
Figure 4:
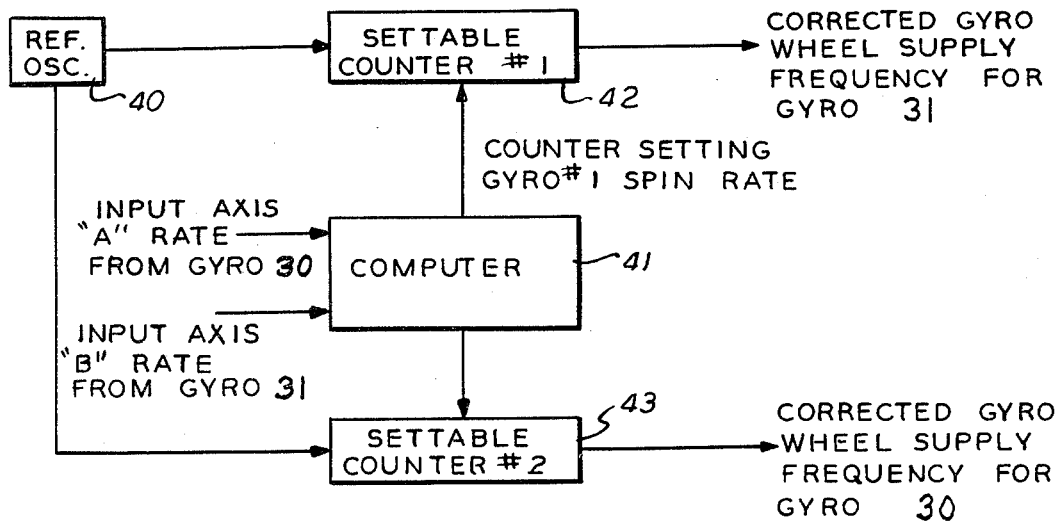
FIG. 4 shows a second embodiment in which the reference oscillator feeds input signals to two adjustable counters which correct the frequency of two gyros and which are controlled by computer outputs.

FIGS. 3 and 4 show a second embodiment of the invention. FIG. 3 shows the normal 2 degree of freedom gyro strapdown system. The signal output of gyro 30 input axis "A" (Z rate) is used by the computer 41 (FIG. 4) to compute the corrected gyro wheel speed for gyro 31. Similarly the signal output of gyro 31 input axis B (X rate) is used by the computer to compute the corrected gyro wheel for gyro 30.

For example, if all rates about all axis are zero and the normal gyro wheel supply frequency was 500 Hz, then if the gyro synchronous motors were two pole, the rotor would be rotating in inertial space at a rate of 500 rev/sec. If a body rate of 1 rev/sec. was imposed about the Z axis, in the same direction as the gyro motor rotation, then gyro 31 would be accelerated until it would be rotating at 501 rev/sec in inertial space. This effect changes the absolute momentum of the wheel and therefore the gyro torquing scale factor. Since the body rotation is measured by gyro 30 input axis "A" the computer can calculate that the frequency of the gyro wheel supply should be reduced to 499 cycles per second. When this frequency is applied to the motor, the combined effect, with the input rate of 1 rev/sec would be to keep the gyro 31 rotor rotating at a 500 rev/sec in inertial space which is constant speed. Therefore the momentum of the gyro would be unchanged and the gyro torquer scale factor would be constant. The computer continuously updates each counter as determined by the appropriate rate measurements and thereby keeping both gyros running at constant speed in inertial space. The equations for gyro 30 and gyro 31 mounted orthogonally to each other on a common frame as shown is:

Motor Freq$_{31}$ = $K[\omega_S - A_{R2}]$

Motor Freq$_{30}$ = $K[\omega_S - B_{R1}]$ where:
$\omega_S$ = Normal gyro wheel speed
$A_{R2}$ = Rate about "A" Axis Gyro 30
$B_{R1}$ = Rate about "B" Axis Gyro 31

In FIG. 4 an input axis rate "A" from gyro 30 and an input axis rate "B" from gyro 31 are applied to inputs of computer 41. Reference oscillator 40 provides inputs to settable counter 42 and settable counter 43. Computer 41 provides update inputs to counters 42 and 43. The computer update rates to counters 42 and 43 should be higher than the band pass of the gyro wheel drive system.

If the gyros are driven by a synchronous motor the action of the torsion spring effect of the motor and the inertia of the gyro rotor will typically have a natural frequency of about 3 cycles per second. If we were to correct the gyro wheel frequency 10 times a second we would isolate the gyro from angular perturbations from steady state up to 10 angular vibration cycles per second. Angular vibration at higher frequencies would be rejected by the band pass of the gyro wheel drive system.

The granularity of the counters and hence the value of the reference oscillator would be determined by the accuracy we require of the gyro wheel frequency in order to achieve the required gyro torquer scale factor accuracy. Obviously the reference frequency cannot be raised without limit. The computer can be used to command the settings of the counter in a predetermined manner so that the counter value will be changed systematically so that the average frequency over an interval of time will have a finer degree of granularity than the reference oscillator. Referring to FIG. 2 again, for example, if there were two frequencies $f_1$ and $f_2$ whose difference was determined by the granularity of the counter the computer could put out a chain of $mf_1$ commands and $nf_2$ commands. The effective average frequency would be:

$$f_A = (mf_1 + nf_2)/(m+n)$$

where m and n are integers.

If $m+n$ were equal to 10, granularity would effectively be increased by a factor of 10.

While particular embodiments of the invention have been shown and described, modifications may be made, and it is intended in the following claims to cover the embodiments which fall within the true spirit and scope of the invention.

I claim:

1. A strapdown inertial gyro system comprising:
   a source of timing signals for driving the wheel of the gyro of said system,
   means for scaling down the frequency of said source of timing signals,
   a source of signals indicative of the spin axis angular rate of said inertial system,
   means responsive to said spin axis angular rate signals and said reference signals for providing a pulse rate signal proportional to the spin axis angular rate of the inertial system, and
   means responsive to said scale down means and said means for providing a signal proportional to the angular rate for counting said outputs to provide a signal correcting the gyro wheel momentum.

2. The device of claim 1 wherein said source of timing signals comprises a reference oscillator providing gyro wheel frequency,
   said scale down means comprises a counter for scaling down the frequency of said reference oscillator,
   said means responsive to said spin axis angular rate comprises a counter for providing output signals proportional to the spin axis rate, and
   said means responsive to said scale down means and said means responsive to spin axis angular rate means comprises an up/down counter that combines the output signals of said scale down counter and said spin axis angular counter to provide signals for the gyro wheel speed compensated for spin angular rate displaced from the gyro spin axis.

3. A device for compensating for gyro wheel frequency inaccuracies comprising:
   a reference oscillator for providing gyro wheel frequency,
   a scale down counter connected to said reference oscillator for counting down the frequency of said reference oscillator,
   a spin axis angular rate counter connected to said reference oscillator having input signals indicative of spin axis angular rate for providing an output signal frequency proportional to the spin axis rate, and an up/down counter connected to the outputs of said scale down counter and said spin axis angular rate counter for combining their outputs to provide a gyro wheel frequency signal corrected for spin axis angular rate displaced from the input axis of said gyro.

4. A strapdown inertial gyro system comprising:

a source of timing signals for driving the wheels of a first and second gyro, a source of input axis rate signals along a first axis from said first gyro, a source of input axis signals along a second axis orthogonal to said first axis from said second gyro, and means responsive to said first and second input axis signals for deriving output signals for controlling and correcting gyro wheel signals of said first and second gyros.

5. The gyro device of claim 4 comprising:

a first settable counter, and a second settable counter said first and second counters being responsive to said means for deriving and controlling signals.

6. A device for correcting the inaccuracies of gyro wheel frequency comprising:

a reference oscillator for providing timing signals for said gyro wheel, a first settable counter connected to said reference oscillator for providing corrected gyro wheel frequency to a first gyro, a second settable counter connected to said reference oscillator for providing a corrected gyro wheel frequency to a second gyro said second gyro being displaced along an axis orthogonal to said first gyro, a source of input axis rate signals along a first axis from said first gyro, a source of input axis signals along a second axis orthogonal to said first axis from a second axis, and computer means responsive to said first and second input axis signals for deriving output signals for controlling said first and second counters to correct the gyro wheel frequencies of said first and second gyros.

* * * * *